United States Patent Office 3,137,640
Patented June 16, 1964

3,137,640
PROCESS OF PRODUCING MIKAMYCINS A AND B CONTAINING HIGH CONTENT OF B COMPONENT
Kiyoshi Watanabe, Tokyo, Japan, assignor to Kanegafuchi Kagaku Kogyo Kabushiki Kaisha, Osaka, Japan, a corporation of Japan
No Drawing. Filed Mar. 28, 1961, Ser. No. 98,763
6 Claims. (Cl. 195—80)

This invention is concerned with improvements in or relating to production of mikamycins A and B having therapeutically important value. It has been described that two antibiotics of mikamycin A and mikamycin B, which are quite different in chemical structure, are produced in culture broth of *Streptomyces mitakaensis* and individually isolated.

One of these, mikamycin A, is pale yellow and amorphous powder, and decomposes at 165° C. Mikamycin A has an optical rotation $[\alpha]_D^{28} = -152$ (c., 1.0 in methanol). Its ultraviolet absorption spectrum in methanol shows an inflexion at 226 m$\mu$. Chemical analysis of mikamycin A gives carbon 62.30%, hydrogen 6.58%, nitrogen 7.33% and oxygen 23.79%, and the molecular formula of $C_{31}H_{39}N_3O_9$ is well emphasized by chemical analysis and molecular weight determination. It was ascertained that this substance contained l-proline and l-glycine as constitutive amino acids.

The other antibiotic, mikamycin B, having the molecular formula of $C_{45}H_{54}N_8O_{10}$ is a white plate crystal and decomposes at 262° C. It shows an optical rotation of $[\alpha]_D^{15} = -61.3$ (c., 1.0 in methanol) and three ultraviolet absorption maxima at 209 m$\mu$, 260 m$\mu$, and 304 m$\mu$. Chemical analysis of mikamycin B gives carbon 62.19%, hydrogen 6.35%, nitrogen 12.83% and oxygen 18.63%. From the acid hydrolyzate of this antibiotic, seven amino acids, i.e., 3-hydroxypicolinic acid, l-threonine, d-$\alpha$-amino-n-butyric acid, l-proline, l-p-dimethylamino-N-methyl-phenylalanine, 1,4-oxopipecolic acid and l-phenylgylcine, were isolated respectively and the chemical structure of mikamycin B was as follows:

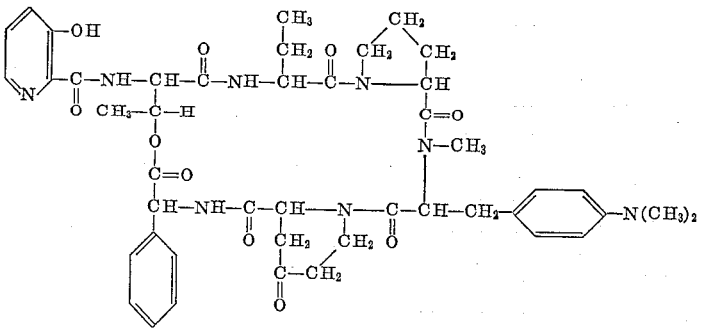

As above described by their chemical formula, constitutive amino acids and other properties, these two antibiotics are elucidated to be of chemically different nature. But, it is very attractive characteristic of these two antibiotics that the mixtures of them shows strong synergistic action against many gram positive and some gram negative bacteria.

Isolation of two or more antibiotics, which plays synergistic action each other, from single culture source of a Streptomyces was already discussed for the following several antibiotics: A and B components of PA114, $M_1$, $M_2$ and S components of staphylomycin and A and B components of E129. These antibiotics have resemblances to mikomycin A or mikomycin B and structural identity of mikomycin B with E129B has been ascertained coincidently. But, the other antibiotics besides E129B are distinctly different from A or B component of mikamycin in the following aspects. The molecular formula of mikamycin A is different from PA114A ($C_{25}H_{31}N_3O_6$ or $C_{35}H_{42}N_4O_9$) and from staphylomycin $M_1$ ($C_{28}H_{36}N_3O_8$), and physicochemical properties of E129A has not yet been described in detail. Mikomycin B is distinguished from PA114B having the molecular formula of $C_{48}H_{61}N_9O_{12}$ by the following points. That is to say; 4-oxopipecolic acid of mikamycin B is substituted by hydroxy-oxymethyl proline ($C_6H_{11}NO_4$); p-dimethylamino-N-methyl-phenylalanine is substituted by an amino acid indicating one C-methyl group; mikamycin B lacks sarcosine. And it was also elucidated that p-dimethylamino-N-methyl-phenylalanine is substituted by N-methylphenylalanine in staphylomycin S ($C_{43}H_{49}N_7O_{10}$).

As described above, this invention relates to manufacturing process of mikamycins A and B which are different from mixtures of other known antibiotics, and the specialized aid in this invention is production of mikamycins A and B containing high content of B component. This invention also embraces application of improved strain, practices of a limited cultural condition and purification processes so that the antibiotic mixtures containing more than 70% of A component and 15% of B component may be obtained. The reason why this invention aids for high content of mikamycin B should be well understood by following descriptions of synergistic action between mikamycin A and mikamycin B.

Minimum inhibitory concentrations of various combinations of mikamycin A and mikamycin B were investigated by serial dilution method against *Staphylococcus aureus* 209P, using glucose nutrient broth. High order of synergism at all combinations of 10–90% of B content is shown in Table 1.

TABLE 1

| Composition (percent): | | | | | | |
|---|---|---|---|---|---|---|
| Mikamycin A | 100 | 95 | 90 | 80 | 70 | 60 |
| Mikamycin B | 0 | 5 | 10 | 20 | 30 | 40 |
| Minimum inhibitory concentration (mcg./ml.) | 0.82 | 0.20 | 0.12 | 0.08 | 0.08 | 0.08 |
| | 50 | 40 | 30 | 20 | 10 | 0 |
| | 50 | 60 | 70 | 80 | 90 | 100 |
| | 0.08 | 0.12 | 0.18 | 0.20 | 0.24 | 2.1 |

This synergistic relation is also elucidated by cylinder agar plate method. Respective and mixed solutions of A and B components at 100 mcg./ml. were assayed on glucose nutrient agar seeded by *Staphylococcus aureus* 209P and their apparent potency were listed in Table 2 by comparison with standard mikamycin A. Namely, stronger synergistic activity than three times to pure A component was observed at the range of from 15% to 60% of B content.

TABLE 2

| Composition (percent): | | | | | | | |
|---|---|---|---|---|---|---|---|
| Mikamycin A | 100 | 95 | 90 | 85 | 80 | 70 | 60 |
| Mikamycin B | 0 | 5 | 10 | 15 | 20 | 30 | 40 |
| Relative potency (percent) | 100 | 190 | 250 | 305 | 330 | 335 | 370 |
| | 50 | 40 | 30 | 20 | 10 | 0 | |
| | 50 | 60 | 70 | 80 | 90 | 100 | |
| | 365 | 340 | 290 | 225 | 135 | 13 | |

Furthermore, the above synergistic relation was observed not only in vitro, but also in vivo. Mice were infected with an intraperitoneal injection of *Streptococcus pyogenes* group A type 3B 930/24. The intraperitoneal treatments of various combinations of two components were given 1 and 7 hours after the infection. Survival ratios (percent) 200 hours after infection are shown in Table 3 and the mean survival hours in brackets.

TABLE 3

| Composition (Percent) | | Doses | | | |
|---|---|---|---|---|---|
| Mikamycin A | Mikamycin B | 0.8 mg.×2 | 0.4 mg.×2 | 0.2 mg.×2 | 0.1 mg.×2 |
| 100 | 0 | 80(62) | 50(137) | 30(102) | 0(34) |
| 90 | 10 | 100 | 100 | 100 | 90(137) |
| 70 | 30 | 100 | 100 | 100 | 100 |
| 50 | 50 | 100 | 100 | 100 | 100 |
| 30 | 70 | 100 | 100 | 100 | 100 |
| 0 | 100 | 80(162) | 70(148) | 20(65) | 0(34) |

Based on the above illustrated truth, mixtures of mikamycin A and B at appropriate proportions were demonstrated to be an effective therapeutic agent against infectious bacteria which caused human disease.

This invention relates to methods of submerged fermentation using a mutant strain of *Streptomyces mitakaensis* (deposited at the Culture Collection Department, The Institute of Applied Microbiology of the University of Tokyo, September 15, 1960, having IAM No. 0407 and ATCC No. 15297) and of extraction and refining of active materials to the mixture containing more than 75% of A component and more than 15% of B component. This insists upon straight production processes of finished goods showing specialized contents of A and B components, for which the known antibiotics showing similar synergistic action are not described, with the exception of mixing pure components with each other.

As hereinafter described, an improved mutant strain of *Streptomyces mitakaensis* (IAM No. 0407 and ATCC No. 15297) is specialized with confidence in this invention. Original producing strain, *Streptomyces mitakaensis*, was improved for higher culture yield by means of ultraviolet light and X-ray irradiation, and of treatment with mutagenic agents. A mutant strain numbered as 12803 was selected, and it was established to accumulate mikamycin A and mikamycin B with good yield in cultural broth. Therefore, morphological characters of the mutant strain were compared with the original strain on several agar and broth media, and on carrot and potato plugs. The cultural characteristics after a week incubation at 30° C. were examined in details. The colors were described according to "Guide to Color Standard (ISCC, N.B.S system)," which was published by Nippon Shikisaisha.

From the results listed in Table 4, it will be understood that the mutant strain is distinguished from the wild strain by observations of morphological characters on many media and by comparison of nitrate reduction ability.

TABLE 4

| Medium | Wild strain | Mutant strain |
|---|---|---|
| Glucose-asparagine agar: | | |
| G | Good, white to pale yellow. | Good, pale yellow to yellowish brown. |
| A | Powdery, thin, grayish white. | Powdery, abundant, yellowish gray. |
| S | None | Pale yellow. |
| Ca-malate-glycerol agar: | | |
| G | Good, colorless to brownish white. | Good, colorless to pale yellow orange. |
| A | Powdery, thin, white to yellowish gray. | Powdery, thin, white to light brownish gray. |
| S | None | Trace, pale yellow orange. |
| Ca-citrate glycerol agar: | | |
| G | Good, colorless to pale yellow orange. | Good, colorless to yellowish brown. |
| A | Powdery, thin, yellowish gray. | Powdery, thin, pale yellow. |
| S | Trace; cream | Pale yellowish brown. |
| Ozapek's agar: | | |
| G | Good, white to pale yellow. | Good, light brownish gray or yellowish gray. |
| A | Powdery, thin, white to light gray. | Powdery, moderate, warm gray. |
| S | Trace, cream | Trace, yellowish brown. |
| Starch agar: | | |
| G | Weak, colorless to pale yellowish brown. | Weak, colorless to pale yellowish brown. |
| A | None | None. |
| S | None, hydrolysis strong. | None, hydrolysis strong. |
| Yeast ex. agar: | | |
| G | Good, wrinkled, cream to pale, yellowish brown. | Good, wrinkled, light brown. |
| A | Powdery, abundant, white to gray. | Powdery, abundant, white to gray. |
| S | None | brown. |
| Meat-peptone agar: | | |
| G | Good, colorless to pale yellowish brown. | Good, colorless to dull yellowish orange. |
| A | Powdery, moderate, white. | Powdery, thin, pale yellowish brown. |
| S | None | None. |
| Nutrient agar: | | |
| G | Good, colorless to pale yellowish brown | Good, colorless to yellowish brown. |
| A | Powdery, thin, white. | Powdery, thin, yellowish gray. |
| S | None | Trace, brown. |
| Glucose-peptone agar: | | |
| G | Good, pale yellow | Good, dull yellow orange or yellowish brown. |
| A | None | Powdery, thin, white to yellowish gray brown. |
| S | do | Trace, dull yellow orange. |
| Tyrosine-agar: | | |
| G | Good, colorless to white. | Good, light yellowish brown. |
| A | Powdery, thin, white | Powdery, moderate, white to yellowish gray. |
| S | None | Pale yellowish brown. |
| Potato plug: | | |
| G | Good, wrinkled, yellowish brown. | Good, wrinkled, yellowish brown. |
| A | Abundant, white to pale yellow. | Abundant, yellowish gray or gray. |
| S | None | None. |
| Gelatin: | | |
| G | Good, colorless to dull yellow. | Good, colorless to dark yellow. |
| A | Grayish white | Grayish white. |
| S | None | Trace, brown. |
| Litmus milk: | | |
| G | Good, colorless to white. | Good, colorless to white. |
| A | None, peptonization and coagulation rapid, pH 6.4 (no change). | None, peptonization and coagulation rapid, pH 6.6 (no change). |
| S | None | None. |
| Nitrate reduction | do | Moderate. |

G: Growth. A: aerial mycelium. S: soluble pigment.

Furthermore, the mutant strain could be respectively distinguished from the three producing strains of streptogramin, PA114 and E129, to which as stated above mikamycin has some or many resemblances. *Streptomyces graminofaciens*, a producing strain of streptogramin, is discriminated from the improved *Streptomyces mitakaen-*

*sis* by the following character, i.e., changing litmus milk to alkaline pH and formation of red-brown soluble pigments on Czapek's agar and potato plug. *Streptomyces olivaceus* ATCC No. 12019, which produces the antibiotic PA114 makes pH of skimmed milk strong alkaline, forms soluble pigment on skimmed milk or potato, hydrolyzes no starch and grows poorly on glucose-asparagine agar. And also, a producer of E129, *Streptomyces ostreogriseus,* are distinguished from the mikamycin producing strain by the following aspects that the former shows little growth on litmus milk and forms deep brown soluble pigment on nutrient agar.

Using the novel mutant, two components of mikamycins are both accumulated in the culture broth. However, as understood from the history of mikamycin that mikamycin A was obtained as a single object at earlier investigation stage, relatively very small ratio of mikamycin B to A component was experienced in an original cultural condition. Accordingly, many inorganic salts at various combinations were investigated in the basal medium comprising 2.0% glycerin, 1.0% soybean meal and 0.5% NaCl, and an improved medium presented hereinafter was composed of the basal medium plus 0.3% $CaCl_2$, 0.2% $CaCO_3$, 0.005% $FeSO_4$, 0.002% $MgSO_4 \cdot 7H_2O$ and 0.002% $ZnCl_2$. The wild and mutant strains were respectively examined in the original and improved media, as arranged in Table 5.

TABLE 5

|  | Wild strain (IAM 0406) | | Mutant (IAM 0407) | |
| --- | --- | --- | --- | --- |
|  | A potency (mcg./ml.) | B potency (mcg./ml.) | A potency (mcg./ml.) | B potency (mcg./ml.) |
| Original medium | 50 | 2 | 412 | 54 |
| Improved medium | 238 | 12 | 902 | 230 |

As shown in the Table 5, it is extremely significant to use the mutant strain and the improved medium, in order to refine the prospective mikamycins A and B with good yield. And such inorganic salts as $K_2HPO_4$, $(NH_4)_2HPO_4$, $CuSO_4$, $MnSO_4$, $ZnSO_4$, $Fe_2(SO_4)_3$, $CuCl_2$, $MgCl_2$, $MnCl_2$, $FeCl_2$ and $FeCl_3$ were recognized to be invalid. In these studies, since the two components were accumulated in wet mycelia than in broth filtrate as higher potency produced, they should be pursued not only by the differential assay method, but also by extraction of them from wet mycelia.

The cultured broth thus obtained are filtered, the extract by aqueous acetone or aqueous lower alcohols is evaporated in vacuo, and the concentrate is combined with filtered broth. Processes, such as extraction using lypophilic solvents or precipitation of crude syrups by addition of petroleum-ether in the concentrate, are common sense to this group of antibiotics. But, in the case that cultured broth contains A at 902 mcg./ml., B at 230 mcg./ml. and the ratio of B component is about 20%, severe attention should be paid in the process of extraction, in order to obtain finished-goods having high content of B component with good yield. That is to say, the hydrophilic solvent such as methanol or ethanol is preferred to acetone as an extracting solvent from wet mycelia, since acetone causes undesirable decomposition of mikamycin A in processes of extraction and evaporation in vacuo. Many lipophilic solvents are listed by respective distribution coefficients of A and B, between solvent layer and water layer, as shown in Table 6. The appropriate organic solvents are judged and determined by their large distribution coefficients and by extractability of contaminants. Esters, ketones and halogenated aliphatic hydrocarbons show large coefficients to both B and A components, but halogenated hydrocarbons are not appropriate because of good solubility for impurity. Then, the most suitable solvents are methylisobutylketone and butyl acetate, which are also supported by good recovery in evaporation.

TABLE 6

| Solvents used | Distribution coefficient (solvent layer/aqueous layer) | |
| --- | --- | --- |
|  | Mikamycin A | Mikamycin B |
| n-Butanol | 8.2 | 3.3 |
| Iso-butanol | 7.8 | 2.9 |
| Amylalcohol | 4.2 | 2.6 |
| Ethyl acetate | 8.3 | 11.8 |
| Butyl acetate | 7.8 | 12.0 |
| Benzene | 4.2 | 12.6 |
| n-Hexane | 2.1 | 3.2 |
| Methylisobutylketone | 8.2 | 13.1 |
| Ether | 3.2 | 3.4 |
| Carbon tetrachloride | 2.2 | 1.8 |
| Chloroform | 24.3 | 18.3 |
| Methylendichloride | 12.1 | 16.8 |
| Ethylendichloride | 10.5 | 13.8 |

The lypophilic organic solvent layer thus obtained is concentrated to one-sixth at 40° C. in vacuo, and a good deal of mikamycin A and B is precipitated by addition of petroleum-ether or n-hexane to the concentrate, forming brown tars. Usually, these tars contain mikamycin A at 35–50%, mikamycin B at 5–10%, antifoamers and half weights of invalid tars orgined from wet mycelia. Restraint of extraction of tar-like substances from wet mycelia is a significant problem, considering good yield in the followed refining process. Because, if good yield in the refining process is obtained, a somewhat low yield in extraction process is offset each other. In order to control the tar, wet mycelia are successfully treated by diluted acid solution. After mikamycin B is eluted outside the mycelia as acid salts, mikamycin A in mycelia is easily extracted by diluted aqueous methanol. The principles of this procedure are suggested by solubilities of mikamycin A and mikamycin B, as shown in Table 7.

TABLE 7

| Solvent used | Solubility (mg./ml.) | |
| --- | --- | --- |
|  | Mikamycin A | Mikamycin B |
| $H_2O$ | 0.5 | 0.05 |
| 40% aqueous methanol | 8.2 | 0.08 |
| 80% aqueous methanol | 32 | 12 |
| Methanol | 200 | 20 |
| 0.01 N hydrochloric acid | 0.4 | 30 |

However, attention should be paid to the extraction practices of pH range of from 3.0 to 4.0 and of short contact time as possible as, because mikamycin A is somewhat labile at or below pH 3.0.

The crude precipitants thus obtained are blackish brown tars or brown pastes, and they should be refined to yellow powder so that their contents of A plus B components may be 90% or more. Man can accomplish these processes by various modified methods, using respective solubility of two antibiotics and impurity in various organic solvents, or using adsorption characteristics of two components on various adsorbents. As a useful practice of them, the following one is specialized in this invention. A weight volume of brown tars are dissolved in 3 volumes of chloroform and the filtrate after removing insoluble matters is added by 3 volumes of benzene, and then a large part of ineffective material and a little of mikamycin A is precipitated. After addition of petroleumether to the supernatant, yellow powder containing mikamycin A at 70% or more and mikamycin B at 12–15% is precipitated, and this powder is not yet enough in purity for the purpose of this invention. The supernatant in which 25% weight of total mikamycin B is dissolved is evaporated in vacuo to syrups containing about 30% of mikamycin B. The syrups are dissolved in acetone, added by hydrogen chloride-saturated acetone, and then white precipitants are formed. After drying the precipitants, they are dissolved in water and neutralized by addition of sodium bicarbonate. Free mikamycin B obtained as white powder is dried and mixed with the above described yellow powder to yield mikamycins A and B containing mikamycin A at 75% or more, mikamycin B at 15% or more. From mikamycin-B rich syrups above described, mykamycin B is separated by various modified methods, because its various salts with hydrochloric acid, sulfuric acid, citric acid, p-toluenesulfonic acid and picric acid are readily soluble in water whereas free mikamycin B is almost insoluble in water. For example, when the syrup methanol solution was added with 90% aqueous methanol containing 1 N hydrochloric acid, hydrochloride of mikamycin B was not precipitated by dilution with water, and impurities besides mikamycin B deposited. When the supernatant is neutralized to pH 5.0–7.0 by addition of sodium bicarbonate, mikamycin B precipitates immediately, forming white powder. The powder thus obtained is easily refined to white plate crystals by recrystallization from methanol. The crystalline sample are used not only in manufacturing of the aided mikamycins A and B, but also in the following purpose.

When mikamycin B was intramuscularly injected in the rabbit ears at a dose of 100 mg./kg., its usual blood level was about 0.2 mcg./ml. But the blood level by hydrochloride under the same condition reached 18 mcg./ml. From these results, the acid-salts of mikamycin B is considered to be useful as an injection, and various modified methods of producing acid-salts is a clear common sense, as described above.

*Example 1*

The sterilized medium of 280 l. volumes containing 2.0% glycerin, 1.0% soybean meal, 0.5% NaCl, 0.3% $CaCl_2$, 0.2% $CaCO_3$, 0.005% $FeSO_4$ and 0.002% $MgSO_4 \cdot 7H_2O$ was inoculated with 2 l. of 24 hours culture of an improved mutant of *Streptomyces mitakaensis* (IAM No. 0407), submerged-cultured at 28° C. The maximum potency of mikamycin A was accomplished in 44 hours, and that of mikamycin B in 36 hours. The cultural potency of B component was brought down speedily after 40 hours, and then the broth of 40 hours culture was filtered. The filtrate contained 162 g. of mikamycin A and 30.1 g. of mikamycin B, and the wet mycelia 90.2 g. of mikamycin A and 34.3 g. of mikamycin B. After the wet mycelia were agitated with 4 volumes of methanol for 2 hours, the filtered extract was evaporated in vacuo and combined with the broth filtrate. The combined solution was extracted with one-third volume of butyl acetate, the extract concentrated to a volume of 1.8 l. in vacuo, and added with 9 l. of n-hexane. Blackish brown tars weighing 465 g. which contained 212 g. of mikamycin A and 43.0 g. of mikamycin B were precipitated and dissolved in 1.5 l. of chloroform, and 48 g. of insoluble powder having no activity was removed by filtration. Brown tars weighing 185 g. which contained 26.2 g. of mikamycin A and 2.1 g. of mikamycin B were precipitated by dropwise addition of 1.5 l. of benzene to the supernatant. The supernatants after decantation were added by 9 l. of benzene to yield pale yellow precipitants, which weighed 198 g. and contained 162 g. of mikamycin A and 28.1 g. of mikamycin B. Its purity of mikamycin A was 82.0% and that of mikamycin B 14.2%, and not enough in content of mikamycin B for the finished goods of this invention.

By evaporation of the supernatant in vacuo, 82 g. of pasty syrups which contained 7.5 g. of mikamycin A and 11.7 g. of mikamycin B were obtained. The syrups were low in purity of A and B, but the content of mikamycin B in them occupied an important position, i.e., 27.2% of that of the above mentioned blackish brown tars. The syrups dissolved in 300 ml. of methanol were added with 30 ml. of 1 N hydrochloric acid solution and then filled up to 1,000 ml. with distilled water. After removing insoluble substances by decantation and addition of 5% aqueous sodium bicarbonate, white turbids occurred to form from about pH 3.5. The white precipitants were complete at pH 5.0–7.0. After filtration and drying of the precipitants, they were recrystallized from methanol to yield 8.0 g. of white crystals of mikamycin B, which was mixed with pale yellow precipitants to obtain 206 g. of refined powder of mikamycins A and B containing 162 g. of mikamycin A (purity, 78.7%) and 36.1 g. of mikamycin B (purity, 17.5%).

$LD_{50}$ of this sample by intraperitoneal injection to mice was 900 mg./kg., and when administered orally to dogs with a dose of 100 mg./kg. daily for 3 months, significant changes in blood examinations, liver and kidney function tests, or other side effects were not observed.

*Example 2*

After the cultured broth indicated in Example 1 was filtered, the wet mycelia were added with 50 l. of 0.03 N hydrochloric acid and agitated for 20 minutes. A large part of mikamycin B was eluted outside wet mycelia and about 80% of B potency was measured in the filtrate. The mycelial suspension was adjusted to pH 6.0 by 1% sodium bicarbonate solution, agitated with 30 l. of methanol for 30 minutes and filtered. The filtrate and washing water containing 61.2 g. of mikamycin A and 26.5 g. of mikamycin B were combined with the filtrate of cultured broth.

Extraction with butyl acetate, evaporation and precipitation by n-hexane yielded brown and pasty precipitants weighing 412 g. (purity: A 44.4%, B 10.4%). Comparing this process with Example 1, the yield of mikamycin A by this method is a little less because of partial degradation in diluted hydrochloric acid solution. But evaporation process of methanol extracts were removed by this method, and superior precipitants in content of mikamycin B were obtained, because tars from mycelia were less extracted than by methanol of high concentration which is indicated in Example 1. Treatment of these precipitants by the same method as indicated in Example 1 yielded 201 g. of finished powder of mikamycins A and B which contained 156 g. of mikamycin A (purity 77.6%) and 36.6 g. of mikamycin B (purity, 18.2%).

*Example 3*

White plate crystals of mikamycin B weighing 5.0 g. dissolved in 50 ml. of acetone were bubbled with dry hydrogen chloride to form white precipitants. After precipitation ceased, 5.12 g. of mikamycin B hydrochloride was obtained by filtration and drying. Solubility of the powder in water was about 50 mg./ml., and the aqueous solution of 5 mg./ml. showed pH of 2.1. $LD_{50}$ by intravenous injection to mice was 150 mg./kg., and intravenous injection in three rabbit ears at a dose of 100 mg./kg. showed maximum blood concentration after an hour and the averaged blood level was 18.0 mcg./ml.

What I claim is:

1. An improved process for cultivating *Streptomyces mitakaensis* which comprises fermenting a mutant of *Streptomyces mitakaensis* (IAM No. 0407) by an aerobic submerged cultivation in an aqueous organic nutrient medium containing at least one inorganic salt selected from the group consisting of $CaCl_2$, $CaCO_3$, $FeSO_4$, $MgSO_4$, and $ZnSO_4$, thereby obtaining a cultured broth containing mikamycin A and B, the weight ratio between said mikamycin A and B being 90–70:10–30.

2. A process for producing mikamycins A and B containing at least 15% mikamycin B to the sum of two components, which comprises extraction of mikamycin A and mikamycin B from cultured wet mycelia of *Streptomyces mitakaensis* obtained from the cultured broth prepared in accordance wth the process of claim 1 by use of lower alcohols selected from the group consisting of methanol and ethanol, combining the concentrate of these extracts with the filtered broth, and then extracting mikamycin A and mikamycin B from the combined solution by lipophilic solvents.

3. A process for producing mikamycins A and B in accordance with claim 2, which comprises extraction of mikamycin A with lower alcohols from wet mycelia and mycelial suspension, after the wet mycelia and mycelial suspension was preliminarily treated with diluted aqueous acid in order to elute mikamycin B outside the mycelia.

4. A process for eluting mikamycin B and A outside the mycelia in the cultured broth of *Streptomyces mitakaensis* (IAM No. 0407) which comprises adjusting the pH of said cultured broth to 3.0 to about 4.0 with a diluted acidic solution, and treating the same with lower alcohols selected from the group consisting of ethanol and methanol.

5. A process for producing mikamycins A and B in accordance with claim 2, which comprises purification of mikamycins A and B from tar-like precipitants containing mikamycin's two components by the successive use of chloroform, benzene and thereafter normal hexane.

6. A process for refining a tar-like precipitant obtained by extracting an aqueous solution and suspension containing mikamycin A and B obtained from the cultured broth of *Streptomyces mitakaensis* (mutant strain IAM No. 0407), which comprises dissolving said tar-like precipitant in chloroform, adding to the resultant solution benzene, filtering the solution, and adding normal hexane to the resultant filtrate, thereby obtaining as a precipitant a mixture of mikamycin A and B containing not less than 70% by weight of mikamycin A and not less than 12% by weight of mikamycin B.

References Cited in the file of this patent
UNITED STATES PATENTS

| | | |
|---|---|---|
| 2,787,580 | Sobin | Apr. 2, 1957 |
| 2,865,815 | Lindenfelser et al. | Dec. 23, 1958 |
| 2,966,493 | Allen et al. | Dec. 27, 1960 |
| 2,987,518 | Hoffman et al. | June 6, 1961 |

OTHER REFERENCES

Antimicrobial Agents Annual, 1960, page 64.